UNITED STATES PATENT OFFICE.

OSCAR LUDVIG CHRISTENSON AND KARL IWAN MATTIAS GISIKO, OF STOCKHOLM, SWEDEN; SAID GISIKO ASSIGNOR OF HIS ENTIRE RIGHT TO BROR ALBERT HEDMAN, OF STOCKHOLM, SWEDEN.

PROCESS OF PRODUCING AMMONIUM CHLORID.

1,397,264.

Specification of Letters Patent. Patented Nov. 15, 1921.

No Drawing. Application filed January 12, 1921. Serial No. 436,818.

*To all whom it may concern:*

Be it known that we, OSCAR LUDVIG CHRISTENSON, a citizen of the Kingdom of Sweden, residing at Stockholm, Sweden, and KARL IWAN MATTIAS GISIKO, a citizen of the Kingdom of Sweden, residing at Stockholm, Sweden, have invented a new and useful Process of Producing Ammonium Chlorid, of which the following is a specification.

This invention relates to an improved process for producing ammonium chlorid in coking, distilling and combusting coal and other organic substances containing nitrogen.

It has already been proposed to produce ammonium chlorid as a by-product in coking coal and other fuels containing nitrogen, in blast furnaces and so on in such manner that the fuel used is impregnated with an alkali- or alkali-earth chlorid which at the prevailing temperatures is decomposed by the influence of steam and evolve hydrochloric acid which latter combines with the ammonia expelled from the fuel to form ammonium chlorid, the latter being sublimed and recovered from the gases in any suitable manner.

This invention has for its object to make it possible to obtain a much higher output of nitrogen compounds than hitherto was possible in coking, distilling or combusting coal, lignite, peat, bituminous slate or other organic substances containing nitrogen.

The invention consists, chiefly, in that an alkali- or alkali-earth chlorid and free silica is mixed with the material to be distilled, gasified or combusted whereupon the mixture is heated until ammonium chlorid distils off. The silica acts at high temperatures decomposing on the chlorids and expels in the presence of steam hydrochloric acid which combines with ammonia simultaneously expelled from the fuel to ammonium chlorid and said reactions take place essentially easier and more completely than without the addition of silica.

A still more favorable result is reached, if together with the addition of alkali- or alkali-earth chlorid and silica an addition of free hydrochloric acid is used. The improved result which is gained by such addition seems to result from that the free hydrochloric acid binds the ammonia which is evolved at low temperatures ere the alkali- or alkali-earth chlorid has been decomposed in any considerable extent while the ammonia evolved at higher temperatures is combined with the hydrochloric acid which is formed by the decomposing of the chlorid by the influence of the silica at high temperature.

Example 1: In coking coal we prefer to use 2 kgs. common salt (NaCl) and 3 kgs. silica ($SiO_2$) per 100 kgs. coal. The chlorid and the silica are finely ground and are then mixed with water to a thin pulp which by means of air under pressure or other suitable means is uniformly spread on the fuel to be treated. The output of bound nitrogen will in this process be about 4 times greater than in coking fuel in the normal manner and recovering the ammonia from the gas water obtained.

The ammonium chlorid which is formed in the present process may be collected either in a dry state by cooling the gases to a temperature at which the ammonium chlorid is condensed but which is sufficiently high to prevent the condensation of the vapors which are mixed with the distillation gases, or in the wet way by condensing the ammonium chlorid together with the vapors contained in the gases. In the latter case the ammonium chlorid is obtained in the so called gas water from which it may be recovered by evaporating the solution until the ammonium chlorid crystallizes. In this manner the ammonium chlorid is obtained in a sufficiently pure state to be used as fertilizer. A small percentage of phenols generally adheres to the crude ammonium chlorid said phenols being favorable for vegetation as they kill the animal and vegetable parasites in the earth.

The percentage of ash of the coke produced is, of course, somewhat increased by the alkali- or alkali-earth silicates which are formed according to the present process, but if the coke is intended to be used in the blast furnace process the silicates are favorable in that they increase the firmness of the coke. Furthermore the said percentage of silicates facilitates the reduction of many ores thus enabling the saving of flux.

Example 2: When the invention is applied to blast furnaces the coke or other fuel used is impregnated with a mixture of alkali- or alkali-earth chlorid, free silica and water, for instance 3 kgs. common salt, 4.5 kgs. silica and 6 kgs. water per 100 kgs. fuel.

The ammonium chlorid is driven out in the preheating zone of the blast furnace and is recovered from the blast furnace gases in a dry state by cooling the latter or in the scrubbers used for washing said gases. In the latter case the ammonium chlorid is recovered from the washing water by evaporation.

Example 3: In the destructive distillation of alum slate or other bituminous shales containing nitrogen we prefer to use 2 kgs. common salt, 3 kgs. silica and 4 kgs. water per 100 kgs. slate.

In the destructive distillation ammonia is evolved from the organic matters of the slate which ammonia combines with hydrochloric acid evolved from the salt by the decomposing action of the silica in presence of water to ammonium chlorid which is condensed together with the gas water.

Example 4: In manufacturing illuminating gas from coal we use 3.2 kgs. hydrochloric acid with a percentage of 30% HCl, 2.5 kgs. silica and 4 kgs. common salt per 100 kgs. coal. An output of 33 kgs. ammonium chlorid perton coal may be obtained in this manner.

What we claim is:

1. Process of producing ammonium chlorid in coking, distilling or combusting coal, lignite, bituminous slates or other organic substances containing nitrogen, comprising adding a chlorid of a metal whose hydroxid is alkaline and free silica to the material to be treated, and collecting the ammonium chlorid formed.

2. Process of producing ammonium chlorid, comprising mixing an organic substance containing nitrogen with a chlorid of a metal whose hydroxid is alkaline and free silica, heating the mixture until ammonium chlorid distils off, and recovering said ammonium chlorid.

3. Process of producing ammonium chlorid, comprising mixing an organic substance containing nitrogen with a chlorid of a metal whose hydroxid is alkaline, free silica and water, heating the mixture until ammonium chlorid distils off, and recovering said ammonium chlorid.

4. Process of producing ammonium chlorid, comprising mixing an organic substance containing nitrogen, with a chlorid of a metal whose hydroxid is alkaline, free silica, and free hydrochloric acid, heating the mixture until ammonium chlorid distils off, and recovering said ammonium chlorid.

In testimony whereof we have signed our names.

OSCAR LUDVIG CHRISTENSON.
KARL IWAN MATTIAS GISIKO.